Jan. 9, 1968 C. W. JEEP, JR., ET AL 3,362,588
FUEL SYSTEM WITH PUMP WITHIN SUPPLY CONTAINER
Filed March 9, 1965 2 Sheets-Sheet 1

INVENTORS
CHARLES W. JEEP, JR.
EDGAR W. NIEMEYER
HERBERT H. HAHN
BY
ATTORNEY

Jan. 9, 1968 C. W. JEEP, JR., ETAL 3,362,588
FUEL SYSTEM WITH PUMP WITHIN SUPPLY CONTAINER
Filed March 9, 1965 2 Sheets-Sheet 2

INVENTORS
CHARLES W. JEEP, JR.
EDGAR W. NIEMEYER
HERBERT H. HAHN
BY

ATTORNEY

United States Patent Office 3,362,588
Patented Jan. 9, 1968

3,362,588
FUEL SYSTEM WITH PUMP WITHIN SUPPLY CONTAINER
Charles W. Jeep, Jr., Edgar W. Niemeyer, and Herbert Hahn, St. Louis, Mo., assignors to ACF Industries, Incorporated, New York, N.Y., a corporation of New Jersey
Filed Mar. 9, 1965, Ser. No. 438,336
9 Claims. (Cl. 222—385)

ABSTRACT OF THE DISCLOSURE

The apparatus disclosed embodies a unitary pump and support assembly for use in a fuel receptacle such as an automotive fuel tank. The assembly includes a pump which is positioned at the lower part of the tank and urged into abutting contact with the latter. The pump is suppored on an elongated arm which serves also as a conduit for fuel being discharged from the pump. The unitary assembly is positioned within the fuel tank through an opening in one wall thereof. It is so arranged that after being positioned in the tank wall, the elongated support member will urge the pump into downwardly abutting contact with the tank lower panel thus avoiding or minimizing vibration in both the pump assembly and in the tank. A further means of minimizing vibration within the combination resides in a resilient member interposed within the combination support member and conduit at a position near to the pump.

---

This invention relates to a submergible fuel pump and in particular to a motor-driven fuel pump for use in a closed fuel tank.

Fuel pumps presently contemplated for use directly in tanks, reservoirs and other closed liquid-holding receptacles are preferably disposed at the bottom of the reservoir to achieve a complete an efficient discharge. The pump suction is therefore placed as closely as possible to the floor of the tank and consequently the pump is normally supported from an upper wall to be positioned at the tank lower surface.

It is economical, and practically desirable in fuel-tank manufacture, to provide minimum-sized access openings within the tank wall only sufficiently large to readily accommodate a float-gauge assembly, and other incidental equipment. Thus, a pump assembly may be inserted into the tank by way of an access opening or subsequently removed in a similar manner for repair or replacement of parts which have become worn and damaged.

Fuel tanks of the type presently under consideration for use in automobiles or like vehicles are fabricated in two halves, each half including a peripheral lip. The upper half of the tank is provided with one or more access openings as needed. The halves are then assembled into a unit by clamping or crimping one lip to the other to form a liquid-tight seal.

A characteristic of many automotive vehicles in present-day usage is that the fuel tank is so positioned with respect to the vehicle body, frame and associated members as to be relatively inaccessible. Consequently, the means provided in the tank for receiving a fuel pump, liquid-level indicator and other accessory equipment, is generally limited. It is understandable, then, that the problem of inserting and removing these devices from a tank can be difficult, time-consuming and in many instances may require special equipment.

Heretofore, automotive fuel-tank pumps have usually been designed for suspension within the tank itself. Further, the pump, and a fuel-level indicator if such is used, are normally disassociated and independently operable. Also, in the usual fuel-tank construction for automotive use, the tank is normally relatively flat to best be accommodated within the automobile frame structure. The tank, unless properly supported and reinforced internally, is thus susceptible to vibrations which can be detrimental to the vehicle's operation. Connecting braces and panels may of course be used in the tank structure, but such additional members add to the overall cost of the tank.

It is understood that, in the pumping devices presently contemplated, the pump drive motor is normally connected to a source of electric current. The pump suction is submerged in fuel within the tank, and the pump discharge is connected to a conduit for carrying fuel to an engine carburetor or to other point of usage.

It is therefore an object of the invention to overcome and to avoid the foregoing and similar difficulties which are inherent to both manufacture and assembly of submergible pumps and particularly for use with internal-combustion engines powered by a liquid fuel mixture.

Another object of the invention is to provide an improved pump-assembly mechanism having means cooperative therewith for readily positioning and supporting the assembly in a fuel tank.

A still further object of the invention is to provide a pump mechanism having a combination main support member and liquid-carrying conduit for suspending the pump in a liquid pool.

Still another object of the invention is the provision of a fuel-pump assembly for use in a limited-access tank holding a supply of fuel or similar liquid whereby the pump, together with a float device, are positioned relative to each other on a single supporting conductor which further functions as a bracing member in the tank.

Another object of the invention is to provide a pump assembly for use in fuel tanks, said assembly being so carried as to function as a rigidizing structural member between respective side walls and the lower panel of the tank.

Other objects will become clear from the following description of the invention and the claims appended thereto.

In overcoming the above-noted problems and achieving the stated objectives, the present invention provides, in brief, an electric motor-driven pump device adapted to be readily inserted into or removed from a closed liquid-storage tank such as an automobile fuel tank. Positioning and transfer of the pump-mechanism assembly is achieved by means of a single limited-access opening formed in the tank whereby the pump device may be supported directly from a tank wall in such a manner as to brace the latter. The pump assembly includes a quasi-rigid support member which serves the dual purpose of supporting the pump-drive motor within the tank as to brace the latter, and also the function of providing a liquid-carrying conduit for fuel discharged from the pump.

A mounting means carried at one end of the support member sealably engages the tank at the access opening. Sensing means carried on the support column may include a float device movable in response to the level of liquid in the tank to actuate an indicator and translate information regarding the level of liquid in the tank. The pumping means includes a submergible pump having the pump discharge connected to the support column for passing fuel from the tank.

For a more complete understanding of the invention, reference is made to the accompanying drawings in which.

Figure 1:
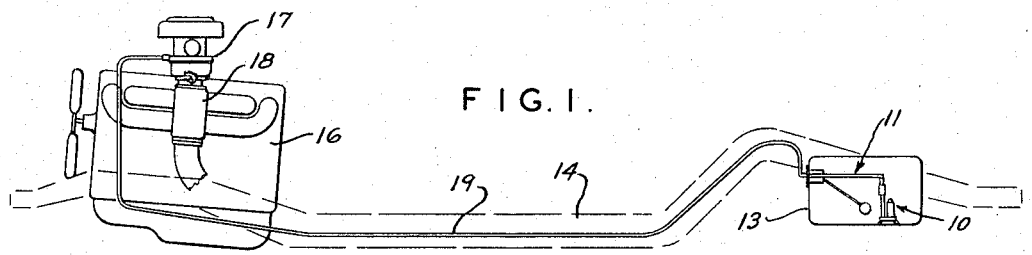
FIG. 1 illustrates a fuel tank connected to an internal-combustion engine, both being supported on the frame of an automobile.

FIG. 1 illustrates an embodiment of a pump assembly 10 positioned in tank 13. The latter is carried on one end of frame 14 of a vehicle, for supplying fuel to an internal-combustion engine 16 carried at the frame other end. A carburetor 17 connected to engine manifold 18 distributes a fuel-air mixture for powering the engine. An elongated line 19 communicates the outlet of conduit 11 with the carburetor inlet for introducing fuel to the latter.

Although it is not made clear from the figures, frame 14 in normal practice supports a body and other incidental equipment which would obscure, and make tank 13 relatively inaccessible from the exterior of the vehicle. It is understood, therefore, that to insert a pump assembly through the tank access opening normally requires a rather articulated movement.

Figure 2:
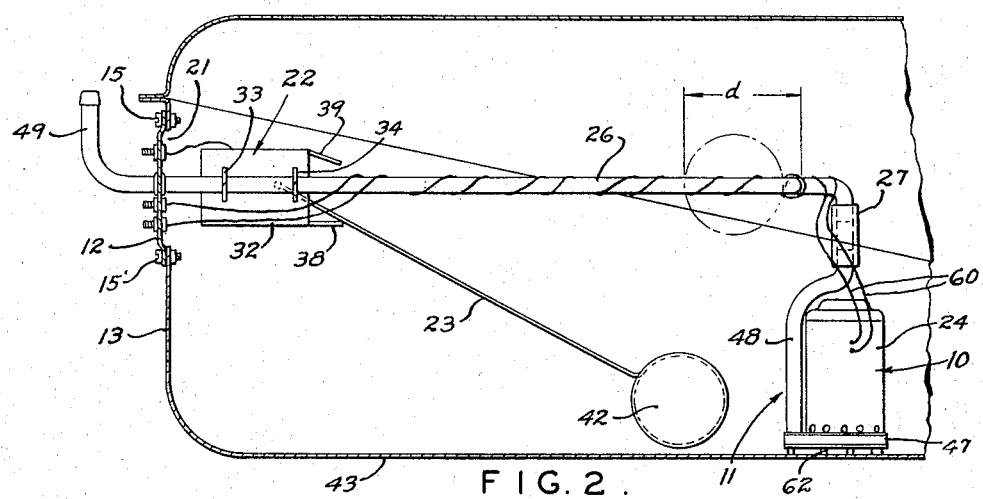
FIG. 2 is a segmentary view on an enlarged scale and in cross section showing a fuel-pump assembly carried in the tank of FIG. 1.

FIG. 2 illustrates specifically one embodiment of a motor-driven fuel-pump 10 supported on conduit means 11, and having a mounting plate 12 depending from the conduit means. Plate 12 sealably engages an access opening 21 formed in a side wall of tank 13. Fastening means 15 and 15' rigidly position mounting plate 12 to dispose conduit 11 within the tank such that the suction of pump 10 is at the lower part thereof.

Figure 3:
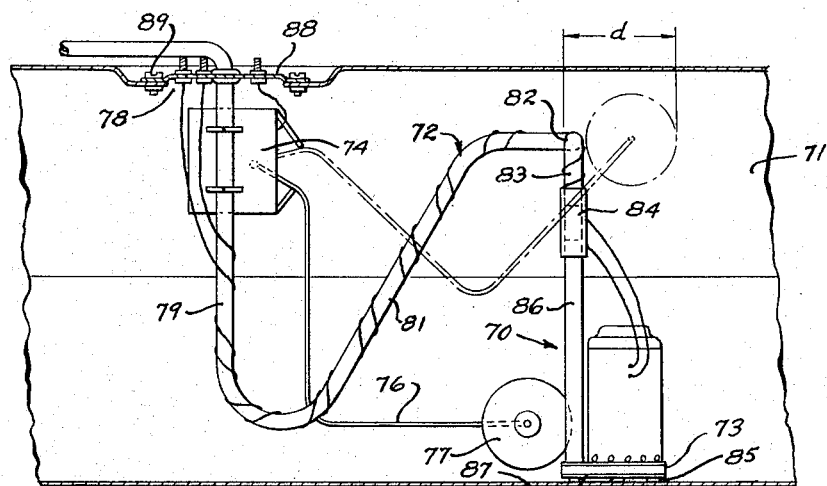
FIG. 3 is a segmentary view on an enlarged scale and in cross section of an alternate embodiment of the invention.
Figure 4:
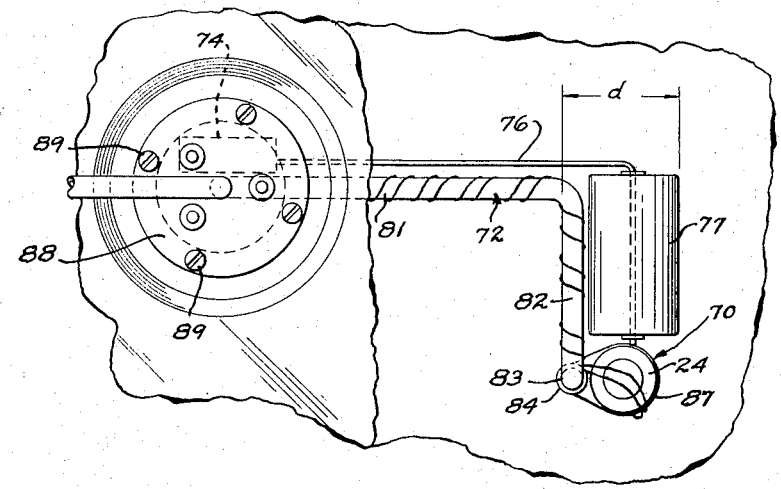
FIG. 4 is a plan view of the pump and gauge assembly shown in FIG. 3.

According to one aspect of the invention, the matter of proper pump positioning within tank 13 has been expedited by supporting the pump assembly from a tank side wall as shown in FIG. 2, rather than from an upper wall as illustrated in FIGS. 3 and 4. Under normal circumstances, when the latter practice is followed, in many instances the entire fuel tank has to be disconnected from the frame and lowered from the automobile to permit removal or replacement of an internally-mounted pump assembly. However, as shown in FIG. 2, with the pump carried in the side wall the operation is substantially simplified.

Again referring to FIGS. 2 and 5, the fuel-pump assembly in detail consists in general of the elongated conduit means or mounting column 11 supporting at one end a sensing means 22 including a float mechanism 23. At the other end, a pumping device 10, which is preferably a centrifugal pump, is coupled to an electric drive motor 24.

Column 11 includes in general at least two tubular members 48 and 26 connected by a semi-rigid sleeve 27; the column, having sleeve 27 integral therewith, is characterized by sufficient rigidity to supportably position pump 10 and motor 24 in the manner above mentioned. The other, or fastening end of column 11, is provided with a generally circular mounting plate 12 having tabs or other suitable locating means not presently shown which are irregularly spaced about the plate to register in corresponding openings in the side wall of tank 13, thereby to align the pump assembly properly in the tank.

Following standard procedure for such pump devices, plate 12 may be provided with a close-fitting liquid seal such as a ring gasket or similar resilient member which, although not shown, is compressed between plate 12 and the adjacent wall of tank 13.

The remote end of conduit 11 external to tank 13 is provided with an outlet having a coupling 49 for engaging a mating conduit, tube, or other means for conducting fuel from the tank to a point of use.

Sensing means 22 depending from column 11 includes a switch box 32 having tabs 33 and 34 depending outwardly from one side thereof and adapted to clamp against support member 26 for positioning box 32 adjacent to mounting plates 12. Box 32 as shown is preferably formed with opposed end panels, having outwardly projecting tabs 38 and 39, the latter being so disposed and manually adjustable to regulate the vertical arcuate movement of the float arm 23 in a manner to be hereinafter more fully described.

Box 32 encloses primarily a coil or similar device disposed in contact with a movable brush member. In normal operation the brush member is permitted to slide along the coils in electrical contact therewith, both coil and brush being connected into an electrical sensing circuit. The brush member is mechanically engaged, either directly or through a linkage, to float arm 23 which actuates the brush. Float arm 23 is so arranged in accordance with the invention such that, when the pump assembly is positioned in the tank, arm 23 will move in a generally vertical, arcuate path in response to the level of liquid in the tank 13. The above-noted tabs 38 and 39 regulate the movement of the arm within a predetermined distance of travel.

Figure 5:
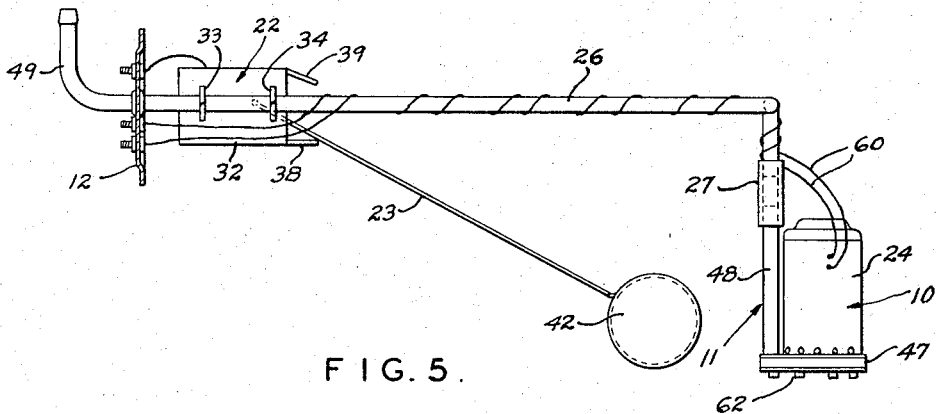
FIG. 5 is a segmentary view on an enlarged scale and in partial cross section showing an embodiment of the pump assembly of FIG. 1.

Referring to FIGS. 2 and 5, the remote end of float arm 23 is connected to float member 42 which may be a ball, a cylindrical member, or other suitable form, preferably elongated, and disposed with the longitudinal axis positioned parallel to the axis of a portion of member 26. The pump end of conduit 11 is shown offset in a direction approximately normal to horizontal conduit member 26. To provide maximum cooperation with lower wall 43 of tank 13, pump 10 is preferably positioned in the approximate center of the wall.

When the pump assembly is used in an automotive system, pump motor 24 may be connected through leads 60 to a 6- or 12-volt current source. The leads may be twisted about conduit 11 or passed directly to the motor and thereafter passed through a terminal in plate 12 to make a fuel-tight connection with the latter. It should be appreciated that the voltage of the drive motor, although mentioned as being 6 or 12 volts, as is normal to most automotive systems, may be connected to any power source adapted to drive the motor.

In the embodiment of the pump assembly shown in FIGS. 1, 2 and 5, drive motor 24 is enclosed within a rather narrow, elongated cylindrical casing to provide a compact unit arrangement and to facilitate insertion into the fuel tank 13. The motor casing is preferably shaped and positioned to engage and form an extension to pump 10 casing.

As shown in FIGS. 2 and 5, pump casing includes a flange 47 depending axially therefrom and having openings to receive fastening bolts or like means for engaging the mating motor casing and for mounting the pump and motor as an integral unit.

Conduit 11 communicating with pump 10 includes short tubular leg 48 connected to the pump discharge at flange 47 by soldering or other means to define a rigid joint with the pump casing. Leg 48 extends rearwardly, substantially parallel with the motor casing and thereafter may be inwardly formed toward the motor longitudinal axis to a position substantially coaxial with the latter. The offset portion of conduit 11 includes line 26 disposed substantially perpendicular to leg 48.

Referring again to FIGS. 2 and 5, line 48 is offset in a direction paralleling the longitudinal axis of float 42 and terminates in a horizontal portion disposed adjacent to float 42. Arm 26 is connected, as previously noted, through a relatively firm, although flexible, coupling member 27 to leg 48. Thus, coupling 27 provides communication directly with the pump discharge, and arm 26. Coupling 27 further provides a firm support for biasing arm 48 and pump 10 against the wall 43 of tank 13 to overcome or dampen vibrational tendencies and resulting noise of the latter when the vehicle is in motion.

This is achieved by so designing the relative position of plate 12 with support arm 26 that the latter will normally, when detached from the tank, be unstrained. However, with the pump assembly positioned in the fuel tank, tightening of bolts 15 to sealably fasten plate 12 against the tank access opening will cause the entire support assembly to be distorted to a strained condition. Notably, upright members 27 and 48 will be under a compression stress, and elongated arm member 26 will be under a flexural stress along its entire length, thereby providing a downward bias against the pump thus urging the latter into an abutting although non-fixed position with said lower panel.

Coupling 27 may be a short length of plastic tubing, a metallic bellows, or similar device characterized by a degree of resilience.

The underside of pump 10 is provided with a resilient member 62 to form a cushion between the lower panel 43 and the pump casing. The cushion device shown in FIG. 2 may consist of a substantially flat pad formed of a resilient material such as rubber, a fuel-resistant cellular plastic, or the like. This member may also embody one or more compression springs fixed to the casing and compressed against lower panel 43.

The normal cooperative function of connector 27 and resilient means 62 beneath the pump casing, is to isolate the relatively heavy motor and pump from excessive vibration. The isolating members, however, are sufficiently rigid to maintain the pump assembly as a structural bracing between the tank side wall and the panel 43.

Column 11, as shown in FIGS. 1, 2 and 5, is disposed substantially horizontally, having pump 10 at the lower portion of tank 13 in abutment with wall 43. With pump 10 fixed in position having the cushion member 62 intermediate the pump and the panel, float 42 and arm 23 are so arranged to freely move in a vertical direction in response to the level of liquid in the tank. This range of movement of arm 23 may of course be regulated in accordance with the capacity and size of the tank for sensing the fuel level.

In a preferred form of the invention, during movement of float 42 between extreme upper and lower positions, the arm will define a segment having an arcuate path pivoted about the mounting point of the arm within box 32.

For most conveniently inserting and fastening the pump assembly into tank 13, it is preferred that tank access opening 21 be formed with a cross-sectional area only slightly larger than the distance "d," shown in FIGS. 2, 3 and 4, measured across the outer edge of mounting column 11 and the oppositely positioned extremity of float 42. Similarly, to pass through opening 21 the motor-pump assembly is provided at its maximum width across the pump flange 47 with a dimension not exceeding the size of the tank-access opening 21.

To readily register the pump assembly in opening 21, pump 10 is first positioned such that the latter may be inserted horizontally through access opening 21. Thereafter, arm 23 is adjusted such that the latter extends approximately parallel to and adjacent column 11. Float arm 23 and column 11 are thus aligned such that the assembly may be further inserted into opening 21 to advance pump 10 toward its final position adjacent to and approximately centrally of the lower wall 43.

Similarly, for disengaging and removing the pump assembly, it is necessary only to remove the fasteners 15 and 15' holding plate 12 in place. Thereafter, the entire unit may be slid horizontally from the tank, permitting members 26 and subsequently float 42 to pass through opening 21. By downwardly tilting arm 26, motor 24 is brought into alignment with opening 21, thus permitting the motor pump unit to be withdrawn from the tank.

FIGS. 3 and 4 illustrate an alternate embodiment of the invention in which pump assembly 70 is supported in the upper wall of the tank 71 and is connected by a conduit 72 to the discharge of the pump 73. In the embodiment here illustrated, the support member made up of the pump assembly and the conduit 72, is disposed substantially vertically in the tank to provide the desired rigidizing effect to the tank structure. The pump assembly, however, is so connected by the conduits, to embody a degree of resilience and thereby avoid shock to both the tank and the pump, as hereinbefore mentioned. Further, sensing means 74 is so carried on conduit 72 that the assembly may be readily inserted or removed from the tank 71 as desired.

Referring to FIGS. 3 and 4, the pump assembly conforms in many respects to the assembly shown in FIG. 2. However, in order to be more readily manipulable and insertable into the tank from the upper wall thereof, the conduit 72 is so arranged, together with the float arm 76 and float 77, such that the unit might be readily advanced through the opening 78 in the tank to a desired location.

Referring to FIGS. 3 and 4, conduit 72 comprises a rather elongated member having a downward-positioned portion 79 which terminates in a reverse bend which connects with leg 81; thereafter, through another reverse bend into leg 82 and portion 83 which comprises the downstream or outlet side of the conduit. The resilient connector 84 engages upright leg 86, the latter of which is connected to the discharge of pump 73.

Thus, the pump assembly embodies a degree of resilience formed by both the resilient connector 84 and the reverse bend in the conduit 72. Further, the pump is provided with a shock-absorbing base 87 which bears against a resilient member 85 and the lower wall of the tank for the purpose of isolating the pump and the drive motor from excessive vibration.

The upper end of the conduit is provided with a mounting plate 88 which sealably engages the opening 78 of the tank for positioning the pump assembly 70 in place. As in the previous example, plate 88 may be provided with a gasket to provide a fuel-tight seal and also a plurality of mounting means such as screws 89 disposed about the periphery of the plate for engaging corresponding holes in the tank upper wall.

It is readily seen that the present invention provides both a novel and convenient way for both supporting and rigidizing the fuel tank and for permitting ready access thereto. As noted, the novel fuel-pump assembly may be conveniently transferred to and from the tank by the simple expedient of removing a single support plate rather than by the previous method of disengaging and removing the entire tank from the automobile. The unit further affords a much quieter system, since noise ordinarily created by the operating pump may become excessive if not isolated.

It should be appreciated by those skilled in the art that the foregoing description discloses a preferred embodiment of the invention and that certain changes and modifications may be made therein without departing from the spirit and the scope of the invention as defined in the appending claims.

We claim:

1. The combination in a vehicular fuel tank including side walls connected to an upper wall, and a lower panel connected to the respective side walls thereby forming a closed, fuel holding reservoir of;
   (a) unitary fuel pump assembly removably positioned in said tank for pumping fuel therefrom and for providing a biasing member in said tank thereby to minimize tank vibrations, said unitary pump assembly including;
      (1) a motor driven pump having a suction and a discharge, said pump being disposed in abutting engagement with said lower panel,
      (2) a quasi-rigid support conduit fixed to a wall of said tank and extending therethrough connected to said pump for carrying fuel from said discharge, (3) said quasi-rigid support member when fixed to said tank wall, thereby being distorted from a normally unstrained condition to a condition of flexural strain for exerting a downward bias against said pump to urge the latter into non-fixed positive contact with said lower panel.

2. In the combination as defined in claim 1 including a resilient pad interposed intermediate said pump and said tank wall to further absorb vibrations between said respective members.

3. In the combination as defined in claim 1 including a float mechanism engaging said rigid support member and including,
(1) a float actuated arm member movable in response to the level of fuel held in said tank,
(2) a switch positioned to be actuated by said arm during the above mentioned movement thereof,
(3) and means electrically connecting said pump motor to said switch and to an electrical source thereby forming a circuit whereby operation of said pump motor is regulated by said switch in response to the fuel level in the fuel tank.

4. In the combination as defined in claim 3 wherein said float arm is movable in a plane extending adjacent to said elongated support conduit.

5. In the combination as defined in claim 1 wherein said fuel tank includes an access opening, and a cover carried on said quasi-rigid member, the latter being adapted to form a fluid tight closure to said access opening, said closure being sufficiently large to permit passage of said motor driven pump and support conduit therethrough.

6. In the combination as defined in claim 5 wherein said cover is fixed on said quasi-rigid member in such a position that when said cover is fastened across said access opening, said quasi-rigid member will be distorted to said strained position.

7. In the combination as defined in claim 1 wherein said quasi-rigid support conduit includes; at least one relatively rigid conduit, and a resilient member connected to and forming an integral part of said conduit.

8. In the combination as defined in claim 1 wherein said quasi-rigid support conduit includes; a relatively rigid conduit member disposed in a direction generally parallel to the tank lower panel when positioned in said fuel tank.

9. In the combination as defined in claim 1 wherein said quasi-rigid conduit member includes a pair of rigid conduits, one of said conduits being connected to the discharge of said pump, the other of said conduits extending through a wall of said tank, and a resilient member interposed between and connected to the respective rigid conduits to form a continuous passage for carrying fuel from said pump.

References Cited

UNITED STATES PATENTS

| | | | |
|---|---|---|---|
| 2,530,357 | 11/1950 | Kateley | 222—385 |
| 2,900,112 | 8/1959 | Edwards | 222—385 X |
| 2,961,130 | 11/1960 | Adams | 222—385 X |
| 3,135,220 | 6/1964 | Haynes | 222—385 X |
| 2,940,643 | 6/1960 | Olson | 222—385 X |
| 3,090,318 | 5/1963 | Jeep et al. | 222—385 X |

SAMUEL F. COLEMAN, *Primary Examiner.*